US012670841B1

(12) United States Patent
Chuang et al.

(10) Patent No.: US 12,670,841 B1
(45) Date of Patent: Jun. 30, 2026

(54) VOLTAGE REGULATOR

(71) Applicant: HIMAX TECHNOLOGIES LIMITED, Tainan City (TW)

(72) Inventors: Tsung-Lin Chuang, Tainan City (TW); Chuan-Chien Hsu, Tainan City (TW); Chi-Rong Chou, Tainan City (TW); Wei-Hong Du, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 0 days.

(21) Appl. No.: 19/045,566

(22) Filed: Feb. 5, 2025

(51) Int. Cl.
*G05F 1/565* (2006.01)
*G05F 1/575* (2006.01)
*G09G 3/20* (2006.01)

(52) U.S. Cl.
CPC ........... *G09G 3/2096* (2013.01); *G05F 1/565* (2013.01); *G05F 1/575* (2013.01); *G09G 2330/021* (2013.01)

(58) Field of Classification Search
CPC ...................... G09G 3/2096; G09G 2330/021; G05F 1/565; G05F 1/575
See application file for complete search history.

(56) References Cited

U.S. PATENT DOCUMENTS

| | | | | | |
|---|---|---|---|---|---|
| 4,774,451 | A * | 9/1988 | Mehnert | G05F 1/30 | 323/344 |
| 2007/0053115 | A1* | 3/2007 | Tain | G05F 1/575 | 361/18 |
| 2018/0173258 | A1* | 6/2018 | Singh | G05F 1/575 | |
| 2021/0011505 | A1* | 1/2021 | Chien | G05F 1/575 | |
| 2021/0356979 | A1* | 11/2021 | Liu | G09G 3/20 | |
| 2024/0264618 | A1* | 8/2024 | Darfeuille | G05F 1/59 | |

* cited by examiner

*Primary Examiner* — Temesghen Ghebretinsae
*Assistant Examiner* — K. Kiyabu
(74) *Attorney, Agent, or Firm* — JCIPRNET

(57) ABSTRACT

A voltage regulator is provided. The voltage regulator includes an amplifier circuit, a first output stage circuit, a switching circuit, and at least one second output stage circuit. The amplifier circuit includes a non-inverting input node, an inverting input node, a first output node, and a second output node. The non-inverting input node receives a reference voltage, and the inverting input node receives a feedback voltage. The first output stage circuit is coupled to the first output node and the second output node of the amplifier circuit. The at least one second output stage circuit is coupled to the first output stage circuit in parallel through the switching circuit. The at least one switching circuit is controlled by a control signal. An output current of the voltage regulator is provided by the first output stage circuit and at least one second output stage circuit selected by the control signal.

10 Claims, 4 Drawing Sheets

| CS[2] | CS[1] | CS[0] |
|---|---|---|
| 0 | 1 | 1 |
| 0 | 1 | 0 |
| 0 | 0 | 1 |
| 0 | 0 | 0 |
| 1 | 1 | 1 |
| 1 | 1 | 0 |
| 1 | 0 | 1 |
| 1 | 0 | 0 |

VOLTAGE REGULATOR

BACKGROUND

Technical Field

The present invention generally relates to a technology for stably providing current, and more particularly to a voltage regulator.

Description of Related Art

In many circuit applications, a voltage regulator is used to provide voltage. For example, the voltage regulator can be applied in the screen control circuit of electronic shelf labels (ESL). The voltage regulator can be a high voltage low dropout regulator (HVLDO) or other types of voltage regulator circuit architectures. When the HVLDO is powered on, during a power-on period or a power switch time (PST) period, a large current may momentarily occur due to a significant voltage difference by an output node of the HVLDO, resulting in unnecessary power consumption.

SUMMARY

The disclosure provides a voltage regulator, which may reduce power consumption by controlling multiple output stage circuits and a clamping circuit.

The voltage regulator according to the disclosure is provided. The voltage regulator comprises an amplifier circuit, a first output stage circuit, a switching circuit, and at least one second output stage circuit. The amplifier circuit comprises a non-inverting input node, an inverting input node, a first output node, and a second output node. The non-inverting input node receives a reference voltage, and the inverting input node receives a feedback voltage. The first output stage circuit is coupled to the first output node and the second output node of the amplifier circuit. The at least one second output stage circuit is coupled to the first output stage circuit in parallel through the switching circuit, wherein the at least one switching circuit is controlled by a control signal. An output current of the voltage regulator is provided by the first output stage circuit and at least one second output stage circuit selected by the control signal.

Based on the above, a plurality of output stage circuits with transistors of different aspect ratios and a clamping circuit in the voltage regulator therefore described in the embodiment of the disclosure are controlled during the power-on period or power switch time period for restricting the amount of output current of the voltage regulator, thereby reducing power consumption.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
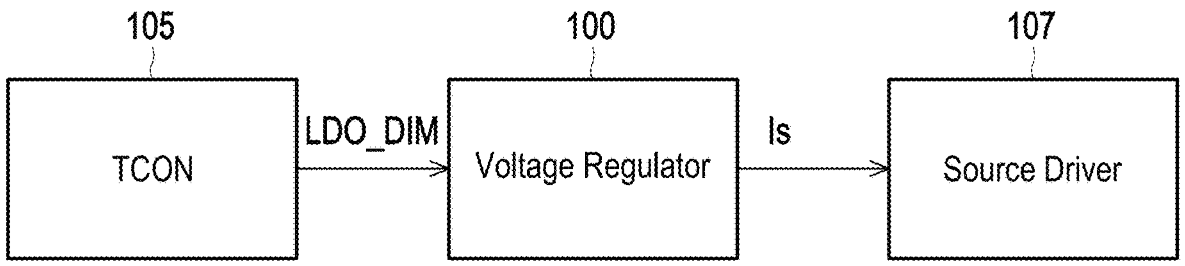
FIG. 1 is a function block diagram of a part of a display system according to an embodiment of the disclosure.

FIG. 1 is a function block diagram of a part of a display system according to an embodiment of the disclosure. Referring to FIG. 1, a display system includes a timing controller TCON 105, a voltage regulator 100, and a source driver 107. The timing controller TCON 105 provides control signals to units (i.e., the voltage regulator 100, the source driver 107, a gate driver . . . and so on) in the display system for displaying images. For instance, the timing controller TCON 105 provides a control signal LDO_DIM to the voltage regulator 100 for providing a source current Is to the source driver 107. The voltage regulator 100 may be a high voltage low dropout regulator (HVLDO). In the embodiment, the display system of FIG. 1 may be the electronic shelf label (ESL).

The voltage regulator 100 may provide large amounts of momentary current due to a significant voltage difference in some periods (e.g., a power-on period or a power switch time (PST) period of the display system). To reduce power consumption, the voltage regulator 100 in the embodiment of the disclosure uses a clamping circuit and a plurality of the output stage circuits with transistors of different aspect ratios to mitigate the momentary current, thus the power consumption is reduced.

Figure 2:
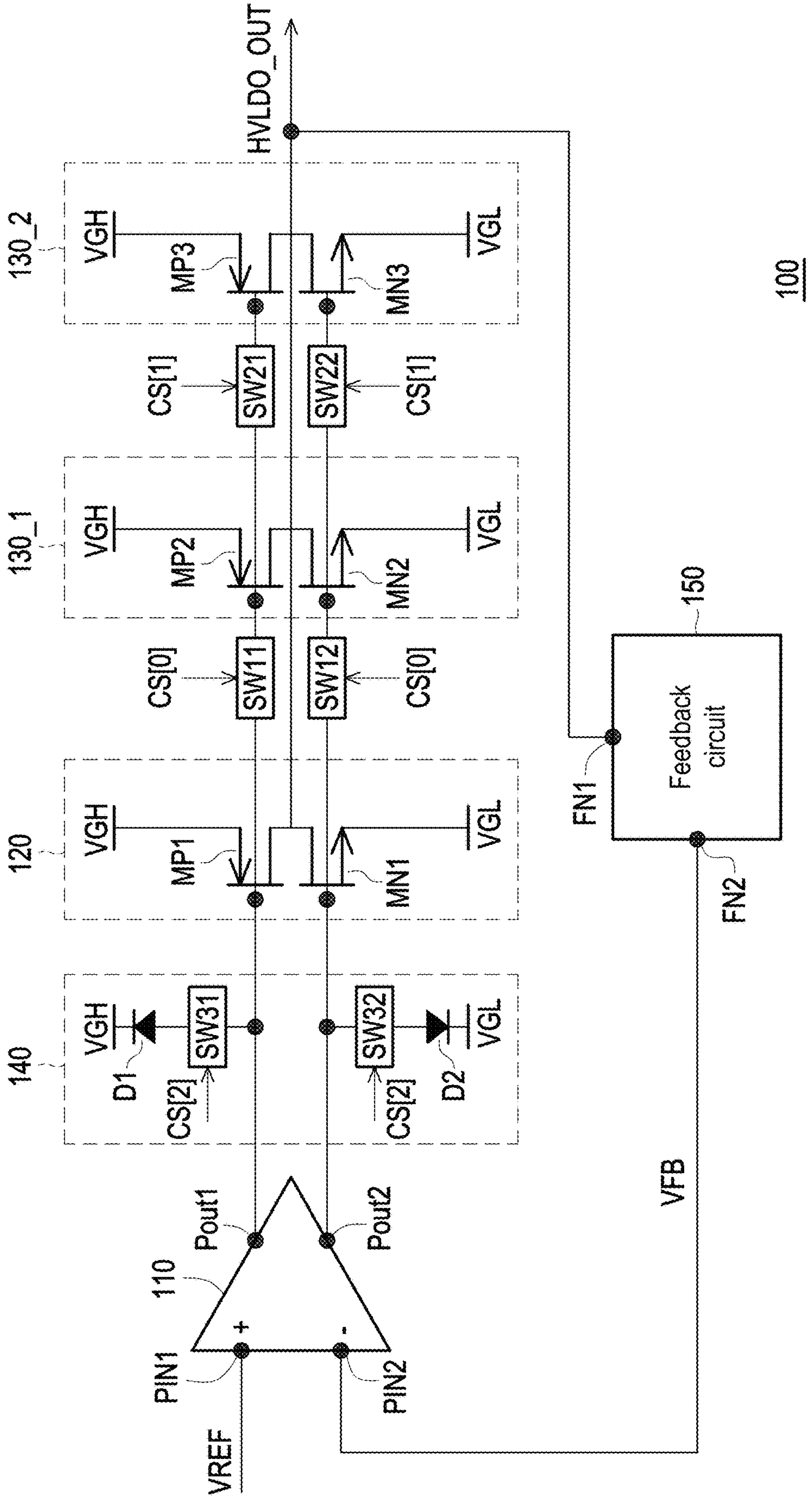
FIG. 2 is a circuit diagram of a voltage regulator according to an embodiment of the disclosure.

FIG. 2 is a circuit diagram of a voltage regulator 100 according to an embodiment of the disclosure. The voltage regulator 100 includes an amplifier circuit 110, a first output stage circuit 120, a switching circuit (e.g., switches SW11, SW12, SW21, and SW22), and at least one second output stage circuit (e.g., the second output stage circuit 130_1, 130_2). The voltage regulator 100 may use in the display system of FIG. 1 with an electronic shelf label (ESL) application.

The amplifier circuit 110 includes a non-inverting input node PIN1, an inverting input node PIN2, a first output node Pout1, and a second output node Pout2. The non-inverting input node PIN1 receives a reference voltage VREF, and the inverting input node PIN2 receives a feedback voltage VFB. The amplifier circuit 110 may be an operational amplifier (OP-AMP).

The first output stage circuit 120 is coupled to the first output node Pout1 and the second output node Pout2 of the amplifier circuit 110. The second output stage circuits 130_1 and 130_2 are coupled to the first output stage circuit 120 in parallel through the switching circuit. The switches SW11, SW12, SW21, and SW22 of the switching circuit are controlled by the control signal CS. In detail, the control signal CS includes first sub-control signals CS[0]-CS[1] and a second sub-control signal CS[2]. The switches SW11 and SW12 are controlled by the first sub-control signal CS[0], the switches SW21 and SW22 are controlled by the first sub-control signal CS[1]. The output current of the voltage regulator 100 is provided by the first output stage circuit 120 and at least one second output stage circuit (e.g., the second output stage circuits 130_1, 130_2) selected by the first sub-control signals CS[0]-CS[1] of the control signal CS.

Each of the first output stage circuit 120 and the second output stage circuits 130_1 and 130_2 includes a first branch transistor (e.g., one of the first branch transistors MP1-MP3) and a second branch transistor (e.g., one of the corresponding second branch transistors MN1-MN3). Take the first output stage circuit 120 for example, the first node (the source node) of the first branch transistor MP1 is coupled to a first voltage (e.g., the high gate voltage VGH), and a second node (the drain node) of the first branch transistor MP1 is coupled to the output node HVLDO_OUT of the voltage regulator 100. The first node (the source node) of the second branch transistor MN1 is coupled to a second voltage (e.g., the low gate voltage VGL), and a second node (the drain node) of the second branch transistor MN1 is coupled to the output node HVLDO_OUT of the voltage regulator 100. The coupling relationship of the first branch transistors MP2-MP3 and the second branch transistors MN2-MN3 may be referring to above description of the first branch transistor MP1 and the second branch transistor MN1.

The control node (the gate node) of the first branch transistor MP1 in the first output stage circuit 120 is coupled to the first output node Pout1 of the amplifier circuit 100. The control node (the gate node) of the first branch transistor MP2 in the second output stage circuit 130_1 is coupled to the first output node Pout1 of the amplifier circuit 100 through the switch SW11 of the switching circuit. The control node (the gate node) of the first branch transistor MP3 in the second output stage circuit 130_2 is coupled to the first output node Pout1 of the amplifier circuit 100 through the switch SW21 of the switching circuit.

The transistors in the first output stage circuit 120 and the second output stage circuits 130_1, 130_2 may have different aspect ratios. In the embodiment, each of the transistors MP1 and MN1 has a first aspect ratio, each of the transistors MP2 and MN2 has a second aspect ratio, and each of the transistors MP3 and MN3 has a third aspect ratio. The first aspect ratio is less than the second aspect ratio, and the second aspect ratio is less than the third aspect ratio. In other words, the current driving capability of the first output stage circuit 120 is lower than the current driving capability of the second output stage circuit 130_1, and the current driving capability of the second output stage circuit 130_1 is lower than the current driving capability of the second output stage circuit 130_2.

The control node (the gate node) of the second branch transistor MN1 in the first output stage circuit 120 is coupled to the second output node Pout2 of the amplifier circuit 100. The control node (the gate node) of the second branch transistor MN2 in the second output stage circuit 130_1 is coupled to the second output node Pout2 of the amplifier circuit 100 through the switch SW21 of the switching circuit. The control node (the gate node) of the second branch transistor MN3 in the second output stage circuit 130_2 is coupled to the second output node Pout2 of the amplifier circuit 100 through the switch SW22 of the switching circuit.

The amplifier circuit 110 further includes a clamping circuit 140 and a feedback circuit 150. The clamping circuit 140 is coupled to the first output node Pout1 and the second output node Pout2 of the amplifier circuit 100. The clamping circuit 140 is controlled by the second sub-control signal CS[2] of the control signal CS for clamping the voltages on the first output node Pout1 and the second output node Pout2 while the clamping circuit 140 is enabled.

In detail, the clamping circuit 140 includes a first diode device D1, a first switch SW31, a second diode device D2, and a second switch SW32. The anode node of the first diode device D1 is coupled to a first voltage (e.g., the high gate voltage VGH). The first node of the first switch SW31 is coupled to the first output node Pout1 of the amplifier circuit 110. The second node of the first switch SW31 is coupled to the cathode node of the first diode device D1. The control node of the first switch SW31 receives the second sub-control signal CS[2] of the control signal CS. The cathode node of the second diode device D2 is coupled to a second voltage (e.g., the low gate voltage VGL). The first node of the second switch SW32 is coupled to the second output node Pout2 of the amplifier circuit 110. The second node of the second switch SW32 is coupled to the anode node of the second diode device D2, and the control node of the second switch SW32 receives the second sub-control signal CS[2] of the control signal CS. While the second sub-control signal CS[2] is enabled (e.g., logic '1'), the voltage of the first output node Pout1 are clamped by the first voltage (e.g., the high gate voltage VGH) and the across voltage of the first diode device D1, and the voltage of the second output node Pout2 are clamped by the second voltage (e.g., the low gate voltage VGL) and the across voltage of the second diode device D2.

The first node FN1 of the feedback circuit 150 is coupled to the output node HVLDO_OUT of the voltage regulator 100 which carries the output current of the voltage regulator 110. The second node FN2 of the feedback circuit 150 is coupled to the inverting input node PIN2 of the amplifier circuit 110.

Figure 3:
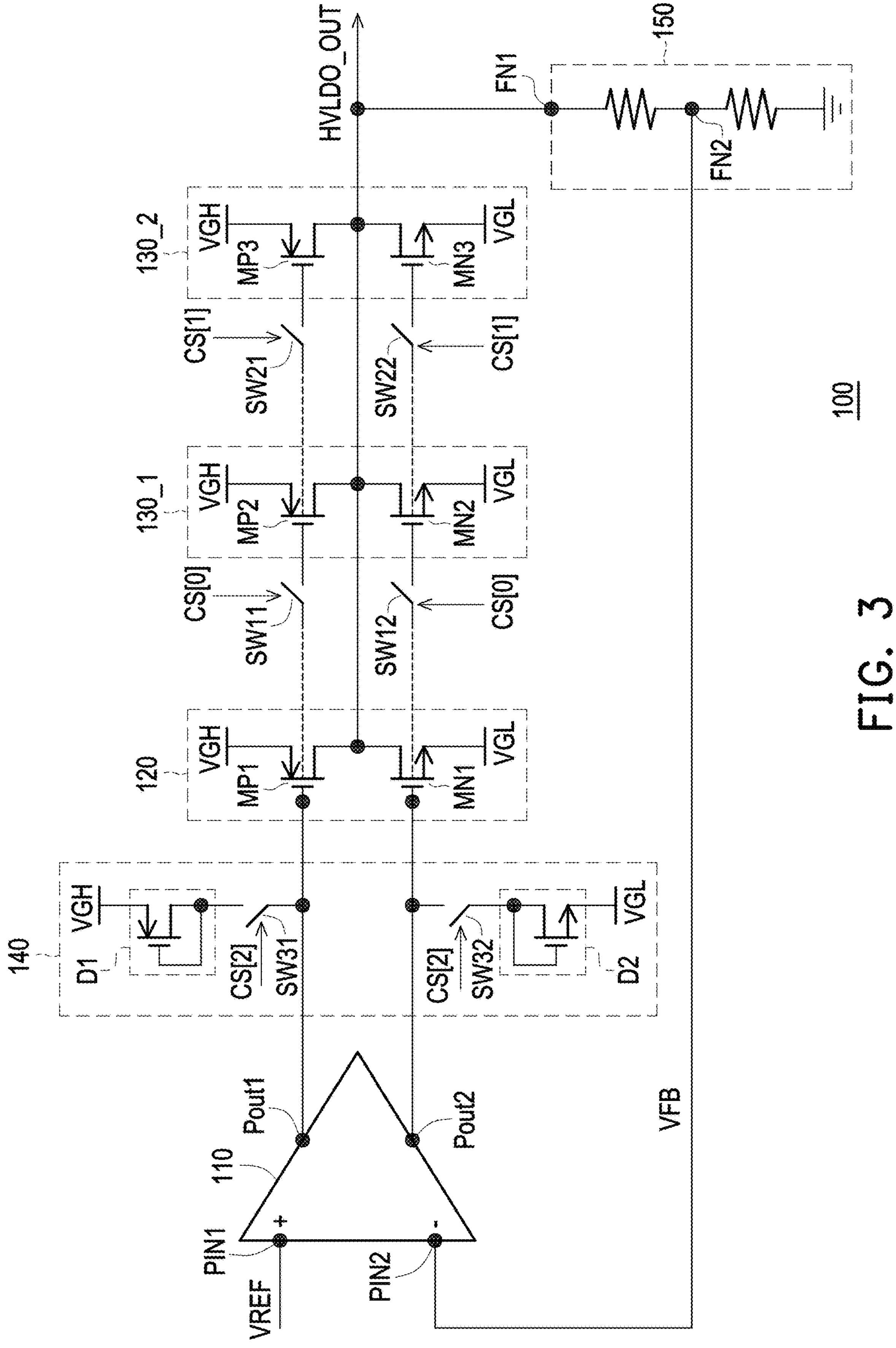
FIG. 3 is a detail circuit diagram of the voltage regulator of FIG. 2 according to an embodiment of the disclosure.

FIG. 3 is a detail circuit diagram of the voltage regulator of FIG. 2 according to an embodiment of the disclosure. In FIG. 3, the first diode device D1 is implemented by a PMOS, and the second diode device D2 is implemented by a NMOS. The feedback circuit 150 is a voltage dividing circuit with two resistors, and the feedback voltage VFB may be 1/10 of the output voltage on the output node HVLDO_OUT of the voltage regulator 100.

Figure 4:
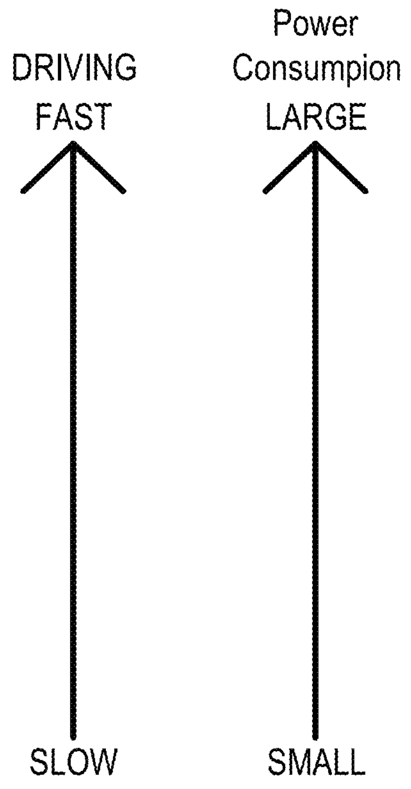
FIG. 4 is a schematic view of the control signal of FIG. 3 according to an embodiment of the disclosure.

FIG. 4 is a schematic view of the control signal of FIG. 3 according to an embodiment of the disclosure. The first sub-control signals CS[0]-CS[1] controls the switches SW11, SW12, SW21, and SW22 of the switching circuit in FIG. 2 and FIG. 3. The second sub-control signal CS[2] of the control signal CS controls the clamping circuit 140.

While the first sub-control signal CS[0] is enabled (e.g., logic '1'), the control node of the first branch transistor MP2 is coupled to the first output node Pout1 of the amplifier circuit 110 through the switches SW11, the control node of the second branch transistor MN2 is coupled to the first output node Pout2 of the amplifier circuit 110 through the switches SW12, then, the first output stage circuit 120 and the second output stage circuits 130_1 are connected in parallel for providing an output current (e.g., the source current Is in FIG. 1) of the voltage regulator. Thus, the second output stage circuits 130_1 are selected by the control signal CS, and the current driving capability of the voltage regulator 100 are improved.

While the first sub-control signal CS[1] is enabled (e.g., logic '1'), the control node of the first branch transistor MP3 is coupled to the first output node Pout1 of the amplifier circuit 110 through the switches SW21, the control node of the second branch transistor MN3 is coupled to the first output node Pout2 of the amplifier circuit 110 through the switches SW22, then, the first output stage circuit 120 and the second output stage circuits 130_2 are connected in parallel for providing an output current (e.g., the source current Is in FIG. 1) of the voltage regulator. Thus, the second output stage circuits 130_1 are selected by the control signal CS, and the current driving capability of the voltage regulator 100 are also improved.

While the second sub-control signal CS[2] is enabled (e.g., logic '1'), the voltage of the first output node Pout1 are clamped by the first voltage (e.g., the high gate voltage VGH) and the across voltage of the first diode device D1, and the voltage of the second output node Pout2 are clamped by the second voltage (e.g., the low gate voltage VGL) and the across voltage of the second diode device D2. The current driving capability of the voltage regulator while the second sub-control signal CS[2] is enabled (e.g., logic '1') is weaker than the current driving capability of the voltage regulator while the second sub-control signal CS[2] is disabled (e.g., logic '0').

According to the list of the first sub-control signals CS[0]-CS[1] and the second sub-control signal CS[2], person applying this embodiment can adjust the current driving capability of the voltage regulator 100 according to their needs by adjusting the control signal CS with first sub-control signals CS[0]-CS[1] and the second sub-control signal CS[2]. In the embodiment of the disclosure, the voltage regulator 100 is applied to a display system, and the display system includes the power-on period, a display update period, a power switch time period, and a power-off period. The control signal SC is enabled in the power-on period and in the power switch time period. In response to the control signal being enabled, one of the at least one second output stage circuit (e.g., one of the second output stage circuit 130_1, 130_2) is selected, and the output current of the voltage regulator 100 is provided by the first output stage circuit 120 and the selected one of the at least one second output stage circuit 130_1, 130_2.

The control signal CS is disabled in the display update period and the power-off period, such as, the first sub-control signals CS[0]-CS[1] and the second sub-control signal CS[2] are disabled (logic '0'). In response to the control signal CS being disabled, no second output stage circuit is selected, and the output current of the voltage regulator 100 is provided by the first output stage circuit 120 only.

In summary, a plurality of output stage circuits with transistors of different aspect ratios and a clamping circuit in the voltage regulator therefore described in the embodiment of the disclosure are controlled during the power-on period or power switch time period for restricting the amount of output current of the voltage regulator, thereby reducing power consumption.

It will be apparent to those skilled in the art that various modifications and variations can be made to the disclosed embodiments without departing from the scope or spirit of the disclosure.

In view of the foregoing, it is intended that the disclosure covers modifications and variations provided that they fall within the scope of the following claims and their equivalents.

What is claimed is:

1. A voltage regulator, comprising:

an amplifier circuit, comprising a non-inverting input node, an inverting input node, a first output node, and a second output node, wherein the non-inverting input node receives a reference voltage, and the inverting input node receives a feedback voltage;

a first output stage circuit, coupled to the first output node and the second output node of the amplifier circuit;

a switching circuit;

a clamping circuit, comprising:

a first diode device, an anode node of the first diode device is coupled to a first voltage;

a first switch, a first node of the first switch is coupled to the first output node of the amplifier circuit, a second node of the first switch is coupled to a cathode node of the first diode device, and a control node of the first switch receives a control signal;

a second diode device, a cathode node of the second diode device is coupled to a second voltage; and a second switch, a first node of the second switch is coupled to the second output node of the amplifier circuit, a second node of the second switch is coupled to an anode node of the second diode device, and a control node of the second switch receives the control signal, wherein the clamping circuit is coupled to the first output node and the second output node of the amplifier circuit, wherein the clamping circuit is controlled by the control signal; and at least one second output stage circuit, coupled to the first output stage circuit in parallel through the switching circuit, wherein the switching circuit is controlled by the control signal, wherein an output current of the voltage regulator is provided by the first output stage circuit and at least one second output stage circuit selected by the control signal, wherein transistors in the first output stage circuit and the at least one second output stage circuit have different aspect ratios, wherein a first aspect ratio of the transistors in the first output stage circuit is less than a second aspect ratio of the transistors in the at least one second output stage circuit, and the second aspect ratio of the transistors in the at least one second output stage circuit is less than a third aspect ratio of the transistors in the at least one second output stage circuit.

2. The voltage regulator of claim 1, wherein the voltage regulator is applied to a display system, and the display system includes a power-on period, a display update period, a power switch time period, and a power-off period, wherein the control signal is enabled in the power-on period and in the power switch time period, wherein in response to the control signal being enabled, one of the at least one second output stage circuit is selected, and the output current of the voltage regulator is provided by the first output stage circuit and the selected one of the at least one second output stage circuit.

3. The voltage regulator of claim 2, wherein the control signal is disabled in the display update period and the power-off period, wherein in response to the control signal being disabled, the at least one second output stage circuit is not selected, and the output current of the voltage regulator is provided by the first output stage circuit.

4. The voltage regulator of claim 1, wherein the control signal comprises:

a first sub-control signal, wherein the selected one of the at least one second output stage circuit which is coupled to the first output stage circuit in parallel is controlled by the first sub-control signal; and a second sub-control signal, wherein the clamping circuit is controlled by the second sub-control signal.

5. The voltage regulator of claim 1, further comprising:

a feedback circuit, a first node of the feedback circuit is coupled to an output node of the voltage regulator which carries the output current of the voltage regulator, and a second node of the feedback circuit is coupled to the inverting input node of the amplifier circuit.

6. The voltage regulator of claim 5, wherein the feedback circuit is a voltage dividing circuit.

7. The voltage regulator of claim 1, wherein the amplifier circuit is an operational amplifier.

8. The voltage regulator of claim 1, wherein each of the first output stage circuit and the at least one second output stage circuit comprising:

a first branch transistor, wherein a first node of the first branch transistor is coupled to the first voltage, a second node of the first branch transistor is coupled to an output node of the voltage regulator; and a second branch transistor, wherein a first node of the second branch transistor is coupled to the second voltage, a second node of the second branch transistor is coupled to the output node of the voltage regulator.

9. The voltage regulator of claim 8, wherein a control node of the first branch transistor in the first output stage circuit is coupled to the first output node of the amplifier circuit, a control node of the second branch transistor in the first output stage circuit is coupled to the second output node of the amplifier circuit.

10. The voltage regulator of claim 8, wherein a control node of the first branch transistor in the at least one second output stage circuit is coupled to the first output node of the amplifier circuit through the switching circuit, a control node of the second branch transistor in the at least one second output stage circuit is coupled to the second output node of the amplifier circuit.

* * * * *